Patented Aug. 14, 1951

2,564,647

UNITED STATES PATENT OFFICE 2,564,647

HYDANTOIN MANUFACTURE

Arthur O. Rogers, Lewiston, N. Y., assignor to E. I. du Pont de Nemours & Company, Wilmington, Del., a corporation of Delaware No Drawing. Application March 5, 1947,
Serial No. 732,653

17 Claims. (Cl. 260—309.5)

This invention relates to the preparation of hydantoins and particularly to the new compound 5-(delta-hydroxybutyl) hydantoin and to a novel method for the preparation thereof.

One of the objects of this invention is to provide a new process for the production of 5-(delta-hydroxybutyl) hydantoin. A further object is to provide a new and useful chemical intermediate 5-(delta-hydroxybutyl) hydantoin. These and other objects will be apparent from the ensuing description of the invention.

The above objects are attained in accordance with my invention by reacting in an aqueous system at elevated temperatures delta-hydroxyvaleraldehyde, a compound yielding carbonate ions, a compound yielding ammonium ions and a compound yielding cyanide ions.

In a preferred method of carrying out my invention a compound yielding carbonate ions, a compound yielding ammonium ions and a compound yielding cyanide ions are reacted directly with the products obtained by the hydration of dihydropyran in a dilute aqueous acid medium.

In general, I may proceed by hydrating dihydropyran in a dilute mineral acid. For example, there may be utilized 0.02 N hydrochloric acid to which dihydropyran is added with agitation and heating. I have found that about 200 cc. of 0.02 N hydrochloric acid is suitable for each mole of dihydropyran. Although the concentration of the mineral acid is in general not critical, at least one mole of water should be present for each mole of dihydropyran utilized. I prefer to utilize an excess of water, for example, about 10 moles of water for each mole of dihydropyran. The reaction is exothermic and the temperature may rise to about 80° C. At a temperature of 60-80° C., the reaction is rapid and is usually complete in about 15 minutes. The time required for complete reaction may be decreased by utilizing pressures greater than atmospheric and when operating under increased pressure, temperatures up to 150° C. are satisfactory. When the reaction mixture becomes clear, the reaction is complete and the mixture of reaction products may then be neutralized with an alkali, for example, with sodium bicarbonate to minimize polymerization of hydroxyvaleraldehyde present.

The mixture thus obtained by the acid hydration of dihydropyran is suitable for use directly in the preparation of 5-(delta-hydroxybutyl) hydantoin. However, if desired, delta-hydroxyvaleraldehyde may be isolated from the mixture by distillation and the purified material used in the preparation of the hydantoin. I prefer to utilize the crude mixture obtained by the hydration of dihydropyran as described above.

Thus, for example, there may be added to the crude mixture of hydration products ammonia and carbon dioxide or other compounds yielding ammonium ions and carbonate ions, for example, ammonium carbonate, and a compound yielding cyanide ions, for example, hydrogen cyanide or sodium cyanide. The reaction mixture may then be heated at temperatures of about 60 to 120° C. during several hours. The product, 5-(delta-hydroxybutyl) hydantoin, is then obtained by crystallization from the reaction mixture. Additional amounts of the product are obtained by partial vaporization followed by further crystallization.

I have further discovered that the yield of 5-(delta-hydroxybutyl) hydantoin may in most instances be substantially increased by treatment with acid following completion of the reaction. It is believed that the increase in yield is due to conversion of an intermediate formed during the reaction to the desired product. Accordingly, in a preferred method of operating my invention, when the reaction to form the 5-(delta-hydroxybutyl) hydantoin is complete the reaction mixture is acidified with a strong mineral acid, preferably hydrochloric acid, and heated. The degree of heating is not critical but is preferably maintained at about 80° to 100° C. At lower temperatures the conversion is slow and no advantage is apparent in utilizing higher temperatures. About 1 to 3 hours is usually sufficient although longer or shorter periods of heating may be required depending upon the temperature. Strong acids other than hydrochloric may be used, for example, sulfuric acid. I prefer to use hydrochloric acid since this acid is economical, effective and has no adverse effect upon the product.

If desired, the product may first be recovered from the reaction mixture and the mother liquor subsequently treated with acid as described above.

The process of my invention wherein delta-hydroxyvaleraldehyde or a crude mixture obtained by the hydration of dihydropyran is reacted with a compound yielding carbonate ions, a compound yielding ammonium ions and a compound yielding cyanide ions is preferably carried out in an alkaline medium. If, for example, ammonium chloride, hydrogen cyanide and carbon dioxide are utilized it is preferred to add an alkali, for example, sodium hydroxide or sodium carbonate. However, it is not essential that alkaline conditions be utilized and neutral or slightly acid conditions may be utilized if desired although I have found that optimum results are obtained by utilizing an alkaline reaction medium.

The product, 5-(delta-hydroxybutyl) hydantoin, was found to contain the calculated percentage of nitrogen. By treatment with hydrochloric acid, it was converted to 5-(delta-chlorobutyl) hydantoin, analysis of which showed the calculated percentage of chlorine. The chlorobutyl hydantoin, on treatment with ammonia, yielded 5-(delta-aminobutyl) hydantoin. The latter was isolated as the hydrochloride, which contained the calculated quantity of ionizable chlorine. Hydrolysis of the aminobutyl hydantoin yielded lysine, which has been isolated as the dihydrochloride, and as the monohydrochloride. Each of these compounds had the correct melting point and ionizable chlorine content. Feeding tests showed these products to have the predicted biological activity when added to a lysine-deficient diet.

As further confirmation of its identity, 5-(delta-hydroxybutyl) hydantoin, was hydrolyzed with hydrochloric acid. The product, $\alpha$-amino-$\epsilon$-chlorocaproic acid was identical with that obtained by similar treatment of 5-(delta-chlorobutyl) hydantoin, and was identified by analysis for nitrogen content. When treated with ammonia, the amino-chlorocaproic acid yielded pipecolinic (piperidine-$\alpha$-carboxylic) acid.

The following examples illustrate my invention:

*Example 1*

One mole (102 g.) of distilled delta-hydroxyvaleraldehyde was mixed with 1 mole (27 g.) of liquid hydrogen cyanide. Four moles (270 cc.) of concentrated ammonium hydroxide were saturated with carbon dioxide while heating to 56° C. The aldehyde-hydrogen cyanide mixture was run in gradually (1 hour), and the mixture heated under a carbon dioxide atmosphere with stirring for 5 hours. The solution was evaporated to about 100 cc., cooled to crystallize the product and filtered. The product was recrystallized twice from 95% ethanol, decolorizing with charcoal. The purified product (19.5 g.) melted at 151-2° C. Analysis by the Kjeldahl method showed 16.0% N (calculated 16.3%).

*Example 2*

Dihydropyran (4.56 moles, 383.5 g.) was stirred with 1 liter of water and 20 cc. 1 N hydrochloric acid in a water bath at 40° C. until a clear solution was obtained. The mixture was cooled and the flask swept with carbon dioxide. Hydrogen cyanide (4.15 moles, 167 cc.) was added and 28% aqueous ammonia (4.56 mole, 304 cc.) added dropwise over a 2 hour period while stirring vigorously under a carbon dioxide atmosphere. The temperature rose to 48° maximum during the addition of the ammonia and was afterward held at 50-60° for about 12 hours. Stirring under carbon dioxide was continued throughout the heating period. On cooling to 5-10° C., a crop of 5-(delta-hydroxybutyl) hydantoin weighing 324 g. (45.2% of theoretical yield) and melting at 149-151° C. was obtained. By evaporating the mother liquor an additional 184 g. of less pure product was obtained. Total yield 71% of theoretical.

*Example 3*

Six liters of water containing 13 cc. concentrated hydrochloric acid was heated to 60° C., and 25 moles (2100 g.) of dihydropyran added gradually with stirring under a reflux condenser. When the solution was clear it was neutralized with 17 g. (0.2 mole) of sodium bicarbonate and cooled in ice water. Hydrogen cyanide (25 moles, 1010 cc.) was added and the solution transferred to a 5 gallon stainless steel vessel previously charged with 3 kg. of ammonium carbonate. The mixture was heated for 3¾ hours, reaching a maximum temperature of 109° C. and pressure of 102 lbs. per square inch. On cooling, 1623 g. of 5-(delta-hydroxybutyl) hydantoin, M. P. 152-3° crystallized. By successive evaporation and crystallization, a second crop of 531 g. (M. P. 148-150.5°) and a third impure crop of 255 g. were obtained. Total yield was 56% of theoretical.

A similar experiment in which 2.5 kg. of ammonium carbonate was used with the same quantities of other materials and in which a maximum temperature of 130° C. was reached, gave 57.4% of the theoretical yield of pure 5-(delta-hydroxybutyl) hydantoin.

*Example 4*

Dihydropyran (3 moles, 252 g.), water (600 cc.) and hydrochloric acid (15 cc. of 1 N) were stirred together until the dihydropyran was dissolved. The solution was cooled and the flask swept with carbon dioxide. A solution of 3 moles (153 g.) of sodium cyanide in 360 cc. water was added slowly with stirring under carbon dioxide. Ammonium hydroxide (3.3 moles, 220 cc.) was added rapidly and stirring under carbon dioxide continued at 50-60° C. for 5 hours and at 40-45° C. over night. The mixture was cooled and acidified with 310 cc. concentrated hydrochloric acid. Two hundred and seventy grams of pure 5-(delta-hydroxybutyl) hydantoin crystallized directly. A second crop containing 26.2 g. of the hydantoin mixed with sodium chloride was obtained by evaporating the mother liquor. The total yield was 57.2% of theoretical.

*Example 5*

Dihydropyran (3 moles, 252 g.), water (600 cc.) and hydrochloric acid (15 cc. 1 N) was stirred together until the dihydropyran was dissolved. The mixture was cooled and a solution of 3 moles (153 g.) sodium cyanide in 360 cc. water added dropwise with stirring under carbon dioxide. Ammonium chloride (3 moles, 160.5 g.) was added and stirring under carbon dioxide continued at 45-60° C. for about 26 hours. On cooling, 232 g. of pure 5-(delta-hydroxybutyl) hydantoin crystallized. An additional crop of 52.5 g. with correct melting point but contaminated with a trace of sodium chloride was obtained by evaporating the mother liquor. The total yield was 55% of theoretical.

*Example 6*

Distilled water (600 cc.) was acidified with 15 cc. 1 N hydrochloric acid and heated to 70° C. Dihydropyran (1 mole, 84 g.) was added and the mixture stirred until the dihydropyran dissolved (45 min.). The solution was neutralized with 1.5 g. sodium bicarbonate and cooled to room temperature. Crude commercial calcium cyanide (24% CN, 84 g.) was added, and the flask swept with carbon dioxide. The mixture was held at approximately 60° C. while stirring under carbon dioxide for 2 hours, then digested over night at approximately 40° C. under carbon dioxide without stirring. The mixture was again heated to 65° C. and filtered to remove calcium carbonate along with insoluble impurities, originally present in the calcium cyanide. The filtrate was evaporated to 200 cc. and cooled to crystallize the product. The latter, when washed and dried, melted at 151–152° C. and weighed 27 g. The mother liquor was acidified with 30 cc. concentrated hydrochloric acid and heated on the steam bath over night. On cooling, an additional 8.9 g. of hydroxybutyl hydantoin, M. P. 146–147°, precipitated. Total yield 35.9 g. (21% of theoretical).

*Example 7*

A solution of 12 cc. 1 N hydrochloric acid in 600 cc. water was heated to 50° C., and 3 moles (252 g.) dihydropyran added. The mixture was stirred until the dihydropyran had dissolved (23 min.), then neutralized with 1.5 g. sodium bicarbonate and cooled to 15° C. Liquid hydrogen cyanide (3 moles, 120 cc.) was added, the air displaced from the reaction flask with carbon dioxide, and 4 moles (270 cc.) concentrated ammonium hydroxide added gradually with stirring (¾ hour). The mixture was heated at 50° C. with stirring under an atmosphere of carbon dioxide until successive titrations for ammonium hydroxide gave constant results (9 hours). The temperature of the mixture was raised sufficiently to dissolve the hydantoin which had precipitated at this point, and the solution divided into two equal parts, which were treated as follows:

a. One portion of the solution was cooled to 15° C., and filtered, the crop of delta-(hydroxybutyl) hydantoin thus obtained weighed 107 g. and melted at 151–151.5° C. An additional 55.8 g., M. P. 140–143° C., was obtained by evaporating the mother liquor and crystallizing from methanol. No additional crystalline product could be recovered from the final mother liquor. The total yield from this portion of the reaction mixture was 162.8 g. (63.2% of the theoretical).

b. The second portion was boiled to expel excess ammonia, acidified with 10 cc. concentrated hydrochloric acid and heated on the steam bath for one hour, at which time it was found to be only faintly acidic. An additional 10 cc. concentrated hydrochloric acid was added, and heating continued for 2 hours (total heating time 3 hours). The solution was cooled and filtered, yielding 180 g. 5-(delta-hydroxybutyl) hydantoin, M. P. 146–148° C. Additional crops of 8 g. (M. P. 140–143°) and 3 g. (M. P. 146–148°) were obtained by successive evaporation and crystallization. The total yield from this portion of the reaction mixture was 191 g. (74% of theoretical).

As a convenient method to determine when the reaction is complete a portion of the reaction mixture is titrated for ammonium hydroxide until successive titrations give constant results. The time required varies with reaction conditions. An alternative method for determining the end point of the reaction is to cool samples of the reaction mixture until successive samples show no increase in the amount of product precipitated.

In practicing the process of my invention, I prefer to carry out reaction at elevated temperatures. For example, temperatures within the range of about 40–150° C. In general, I have found that the best results are usually obtained when temperatures within the range of 60–120° C. are utilized. At temperatures lower than 40°, the reaction is very slow. At temperatures higher than 150° C., no advantage is found.

By compounds yielding cyanide ions, carbonate ions or ammonium ions is meant any compound which produces substantial amounts of the ions in solution. Thus, sodium cyanide and ammonium cyanide are examples of suitable compounds since these give substantial amounts of cyanide ions in solution whereas compounds such as ferrocyanides and copper cyanide do not yield substantial amounts of cyanide ions and are therefore unsuitable for the practice of my invention. Thus, instead of using sodium cyanide, potassium cyanide or hydrogen cyanide as the compound yielding cyanide ions other inorganic cyanides may be utilized. For example, alkaline earth metal cyanides such as barium cyanide or other cyanides which will yield cyanide ions in aqueous solution are suitable. Sodium cyanide or hydrogen cyanide are the preferred cyanide compounds since these materials are readily available at low cost and give high yields of desired product.

Likewise, in place of ammonium carbonate or ammonia and carbon dioxide, other compounds or combination of compounds which will yield carbonate ions and ammonium ions may be used. For example, ammonium chloride and carbon dioxide or ammonium carbamate may be utilized.

Although it is essential to satisfactory operation of my invention that the process be carried out in an aqueous system it is not objectionable and in some instances may be desirable to have present solvents other than water. Thus, there may be utilized monohydric alcohols, for example, ethanol or butanol or polyhydric alcohols, for example, ethylene glycol. Other non-aqueous solvents may be used if desired. Usually it will not be desirable to use more than about 10% by weight of solvents other than water in the system although amounts up to 50% by weight may be present if desired.

The new compound 5-(delta-hydroxybutyl) hydantoin is useful as a chemical intermediate and starting point for the preparation of other useful organic compounds. It is of particular utility in that it may be utilized as the starting point in the synthesis of lysine, a material which is potentially of major commercial importance as a component of feed for livestock and which has not heretofore been available synthetically in commercial quantities.

It is to be understood that the term "dihydropyran" as used in the specification and the claims is intended to designate the compound 2,3-dihydro-1,4-pyran having the following formula:

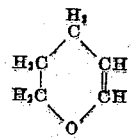

This is the dihydropyran commonly referred to as 2,3-dihydropyran.

I claim:

1. Process for the production of 5-(delta-hydroxybutyl) hydantoin which comprises reacting in aqueous solution at elevated temperatures delta-hydroxyvaleraldehyde, a compound yielding ammonium ions, a compound yielding carbonate ions and a compound yielding cyanide ions.

2. Process for the production of 5-(delta-hydroxybutyl) hydantoin which comprises reacting in aqueous alkaline solution at elevated temperatures delta-hydroxyvaleraldehyde, a compound yielding ammonium ions, a compound yielding carbonate ions and a compound yielding cyanide ions.

3. Process for the production of 5-(delta-hydroxybutyl) hydantoin which comprises reacting in aqueous alkaline solution at elevated temperatures delta-hydroxyvaleraldehyde, a compound yielding ammonium ions, a compound yielding carbonate ions and a compound yielding cyanide ions, heating the resulting reaction mixture with a strong acid and isolating 5-(delta-hydroxybutyl) hydantoin therefrom.

4. Process for the production of 5-(delta-hydroxybutyl) hydantoin which comprises reacting in aqueous solution at a temperature of about 60 to 120° C. delta-hydroxyvaleraldehyde, a compound yielding ammonium ions, a compound yielding carbonate ions and a compound yielding cyanide ions.

5. Process for the production of 5-(delta-hydroxybutyl) hydantoin which comprises reacting in aqueous solution at elevated temperatures delta-hydroxyvaleraldehyde, sodium cyanide and ammonium carbonate.

6. Process for the production of 5-(delta-hydroxybutyl) hydantoin which comprises reacting in aqueous solution at elevated temperatures delta-hydroxyvaleraldehyde, hydrogen cyanide, ammonia and carbon dioxide.

7. Process for the production of 5-(delta-hydroxybutyl) hydantoin which comprises reacting in aqueous solution at elevated temperatures delta-hydroxyvaleraldehyde, sodium cyanide, carbon dioxide and ammonium chloride.

8. Process for the production of 5-(delta-hydroxybutyl) hydantoin which comprises reacting in aqueous solution at 60 to 120° C. delta-hydroxyvaleraldehyde, sodium cyanide and ammonium carbonate.

9. Process for the production of 5-(delta-hydroxybutyl) hydantoin which comprises hydrating 2,3-dihydro-1,4-pyran in dilute aqueous acid medium and reacting the resulting product mixture in aqueous solution with a compound yielding ammonium ions, a compound yielding carbonate ions and a compound yielding cyanide ions at elevated temperatures.

10. Process for the production of 5-(delta-hydroxybutyl) hydantoin which comprises hydrating 2,3-dihydro-1,4-pyran in dilute aqueous acid medium, and reacting the resulting product mixture in aqueous solution with a compound yielding ammonium ions, a compound yielding carbonate ions and a compound yielding cyanide ions at elevated temperatures, acidifying and heating the resulting reaction mixture and isolating 5-(delta-hydroxybutyl) hydantoin therefrom.

11. Process for the production of 5-(delta-hydroxybutyl) hydantoin which comprises hydrating 2,3-dihydro-1,4-pyran in dilute aqueous acid medium, and reacting the resulting product mixture in aqueous solution with a compound yielding ammonium ions, a compound yielding carbonate ions and a compound yielding cyanide ions at elevated temperatures, heating the resulting reaction mixture with hydrochloric acid and isolating 5-(delta-hydroxybutyl) hydantoin therefrom.

12. Process for the production of 5-(delta-hydroxybutyl) hydantoin which comprises hydrating 2,3-dihydro-1,4-pyran in dilute aqueous acid medium and reacting the resulting product mixture in aqueous alkaline solution with a compound yielding ammonium ions, a compound yielding carbonate ions and a compound yielding cyanide ions at about 60 to 120° C.

13. Process for the production of 5-(delta-hydroxybutyl) hydantoin which comprises hydrating 2,3-dihydro-1,4-pyran in dilute aqueous acid medium, and reacting the resulting product mixture in aqueous alkaline solution with a compound yielding ammonium ions, a compound yielding carbonate ions and a compound yielding cyanide ions at about 60 to 120° C., acidifying and heating the resulting reaction mixture with hydrochloric acid and isolating 5-(delta-hydroxybutyl) hydantoin therefrom.

14. Process for the production of 5-(delta-hydroxybutyl) hydantoin which comprises hydrating 2,3-dihydro-1,4-pyran in dilute aqueous acid medium, and reacting the resulting product mixture in aqueous solution with sodium cyanide and ammonium carbonate at elevated temperatures.

15. Process for the production of 5-(delta-hydroxybutyl) hydantoin which comprises hydrating 2,3-dihydro-1,4-pyran in dilute aqueous acid medium and reacting the resulting product mixture in alkaline aqueous solution with hydrogen cyanide and ammonium carbonate at elevated temperatures, acidifying and heating the resulting reaction mixture and isolating 5-(delta-hydroxybutyl) hydantoin therefrom.

16. Process for the production of 5-(delta-hydroxybutyl) hydantoin which comprises hydrating 2,3-dihydro-1,4-pyran in dilute aqueous acid medium, and reacting the resulting product mixture in aqueous solution with sodium cyanide and ammonia and carbon dioxide at elevated temperatures, acidifying and heating the resulting reaction mixture and isolating 5-(delta-hydroxybutyl) hydantoin therefrom.

17. 5-(delta-hydroxybutyl) hydantoin.

ARTHUR O. ROGERS.

REFERENCES CITED

The following references are of record in the file of this patent:

UNITED STATES PATENTS

| Number | Name | Date |
| --- | --- | --- |
| 2,391,799 | Rogers | Dec. 25, 1945 |

FOREIGN PATENTS

| Number | Country | Date |
| --- | --- | --- |
| 566,094 | Germany | Dec. 1, 1932 |

OTHER REFERENCES

Marsh et al., Jour. Am. Chem. Soc., May, 1940, page 1306.